May 23, 1967     J. S. HELLEN     3,320,692

LETHAL TRAPPING DEVICE

Filed Nov. 14, 1963

JAMES S. HELLEN
INVENTOR.

BY

ATTORNEY

United States Patent Office 3,320,692
Patented May 23, 1967

3,320,692
LETHAL TRAPPING DEVICE
James S. Hellen, 47 Sunset Terrace, Packanack Lake, Wayne, N.J. 07471
Filed Nov. 14, 1963, Ser. No. 323,855
2 Claims. (Cl. 43—65)

This invention relates to devices for the destruction of rodents and, in particular, to lethal trapping devices for mice.

Despite the variety of the paraphernalia and techniques which have been devised over the years for the elimination of rodent pests, only two are used to any great extent: (1) poisoned bait and (2) the spring-bar trap. Both have important disadvantages. The use of poisonous bait poses a serious safety hazard and must be used and stored with caution to avoid accidental poisoning of children or household pets.

The spring-bar trap has equally undesirable, if not so deadly, shortcomings. The trigger plate is highly sensitive, a fact which necessitates that the trap be handled very gingerly once set; even a slight jar when setting down the baited trap is sometimes sufficient to release the trigger. This requires re-setting, sometimes with smarting fingers, the not infrequent penalty for imprudence in the selection of a hand hold when placing the trap down.

Even setting a most widely-used type of spring-bar trap requires no mean dexterity and, of course, when the traps are successful in the annihilation of their quarry, they are the bane of the squeamish and the over-fastidious, not to mention the victim which is sometimes painfully injured rather than killed outright.

It is, therefore, the fundamental general object of the present invention to provide devices for the destruction of rodents, particularly mice, which overcome or mitigate at least one of the problems of the prior art as outlined above.

A more specific object is the provision of lethal trapping devices which are fully self-contained, requiring neither setting nor baiting.

Another object is the provision of lethal trapping devices which are neat and easy to use, humane in operation, and free of any hazardous aspects.

A further object is the provision of lethal trapping devices which can be manufactured and sold at such low cost as to render them disposable after use.

Still another object is the provision of lethal trapping devices susceptible to packaging and marketing in accordance with the most effective of modern techniques.

A further object is the provision of pre-baited disposable trapping devices in which the bait is preserved and prevented from emitting odors or attracting vermin until the trap is readied for use.

A still further object is to provide trapping devices as characterized in the immediately preceding object which utilizes poisoned bait which is at all times inaccessible to children or household pets, both prior to or during use of the device.

To the attainment of these other objects, the invention contemplates a trapping device which comprises a container closed at one end and, in service, open at the other. A quantity of bait, preferably poisonous, is secured within the container, adjacent the closed end, and a non-return entrance member is disposed adjacent to other end.

In accordance with a particular feature of the invention, the container takes the form of a small, cylindrical cannister of the type popularly referred to as "tin cans," the can having both ends closed with the non-return entrance member located within, adjacent the end remote from the bait, so that the device is hermetically sealed prior to use and is readied for service by simple removal of one end as by means of a conventional household can opener.

Further objects of the invention, its advantages, scope, and the manner in which it may be practiced will become more fully apparent to persons conversant with the art from the following description and subjoined claims taken in conjunction with the annexed drawing in which like reference numerals denote like parts throughout the several views and FIGURE 1 is a perspective elevational view of one of the presently preferred embodiments of the invention;

Figure 1:
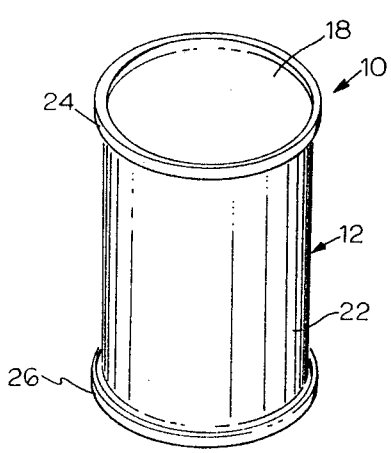
Figure 2:
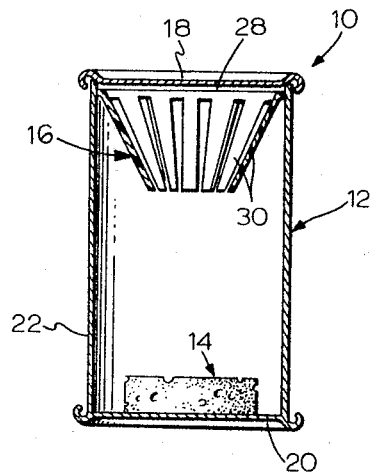
FIGURE 2 is an axial sectional view of the device shown in FIGURE 1.

Referring now to the drawing, and first, in particular, to FIGURES 1 and 2, a trapping device 10 in accordance with the present invention comprises three basic elements: a container 12 of suitable size and configuration; a bait cake 14 within the container adjacent one end thereof; and a non-return entrance member 16 at the other end of the container.

While it is conceivable that the fundamental principles of the invention may be applied to devices for other, larger rodents, it is intended primarily for use on mice and will be described in this connection, by way of example rather than limitation.

Accordingly, the dimensional, configurational, and economic requirements of container 12 are ideally fulfilled by an ordinary "tin can" of the type and size used for frozen fruit juices. These containers have a volume of about 6 fluid ounces and, conventionally, have hermetic end closures 18, 20 secured to the cylindrical body portion 22 by annular beads 24, 26.

In conventional use, i.e., for foodstuffs, either end closure may be removed with a household can opener to remove the contents. For use of this particular type of can in the present invention, one end of the can would be designated for removal as by means of a suitable legend on the label.

In recent months, frozen juices have begun to be marketed in aluminum cans one end of which is removable by means of a pull tab at the center which starts a scored pull tape formed in the can end. The taps runs radially to a point adjacent the rim of the can and then proceeds circumferentially around the entire rim. By means of the pull-tape, the entire can end is removed leaving only a very narrow flange-like remnant projecting inwardly from the rim. This type of can also is very well suited to use as container 12.

As shown in FIGURE 2, bait cake 14 is secured to the inner surface of can end 20. The cake may be formed of any suitable material attractive to rodents; a wide variety of effective baits are known in the art. Preferably, the bait is of the aromatic variety and contains strychnine or other fast-acting poison. It will be appreciated as this description proceeds that the invention enables the use of aromatic baits without the disadvantage of creating odors or attracting vermin while in storage.

Non-return entrance member 16 consists of an annular rim portion 28, adapted to fit coaxially within container 12, and a plurality of flexible, cantilever projections or fingers 30 equi-angularly spaced about the rim. Fingers 30 extend inwardly toward a point on the axis of symmetry of rim 28 but displaced from the plane of the rim; consequently, the fingers are disposed in a conical arrangement with the apex directed into the container.

Entrance member 16 preferably is a monolithic, molded plastic piece. If desired, it may be secured in position with a suitable adhesive although, if the member is a good fit in the can, it will be maintained against displacement by the slight ridge existing around the inner edge of bead 24.

After both bait cake 14 and non-return entrance member 16 are installed within can 12 as shown in FIGURE 2, the final end closure 18 is secured in position to seal the can. Thus, no odors are emitted from the bait cake even though it be of the aromatic variety; the device may be stored indefinitely without deterioration of the bait or loss of effectiveness and is readied for use in a few seconds by simply removing can end 18.

Figure 3:
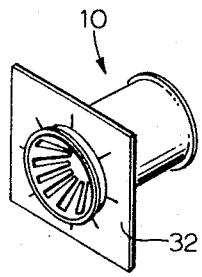
FIGURE 3 is a perspective elevational view of one of the devices as it appears when ready for service.

Referring now to FIGURE 3, to prevent rolling of can 12, a slip-on collar 32 of cardboard or similar material is provided. Collar 32 is preferably square in configuration and contains a central circular aperture 34 of a diameter slightly smaller that that of container body portion 22. A plurality of radial slots 36 around the circumference of aperture 34 permits the collar to slide over the bead 24 of the cam and fit snugly to the body portion. If desired, slits 36 may be lines of perforations instead which would serve the same purpose and equally well.

Figure 4:
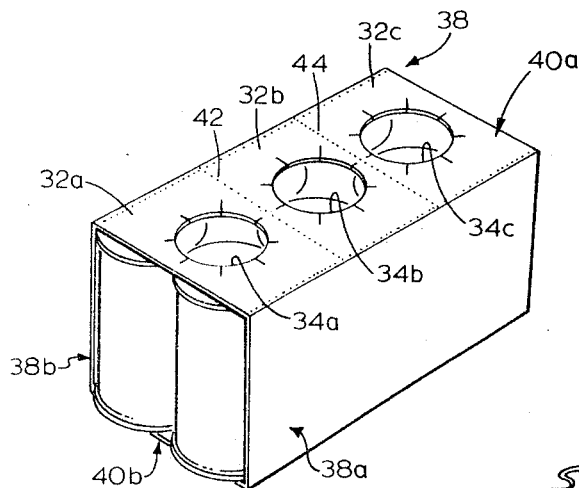
FIGURE 4 is a perspective elevational view of a plurality of the devices shown in FIGURE 1, packaged for sale in a carton which facilitates use of the devices.

In accordance with a particular feature of the invention, a plurality of devices 10 are packaged in a cardboard carton 38 of the "six-pack" type although adaptable to contain a lesser or greater number of units. As shown in FIGURE 4, carton 38 is a simple open-end sleeve made up of four rectangular panels, i.e., side panels 38a, 38b and top and bottom panels 40a, 40b. The carton is designed and perforated to define separable portions which serve as a roll-prevention collar 32 for each unit contained therein. Thus, in the illustrated embodiment, top panel 40a is divided into three equal rectangular areas 32a, 32b, 32c by parallel lines of perforations 42, 44. Each area 32a . . . 32c contains a respective central aperture 34a, 34b, 34c having radially slotted circumferences, all in the manner already described with reference to collar 32, FIGURE 3. Bottom panel 40b is a duplicate of 40a so that the entire carton provides six collars, one for each can. The apertures in the top and bottom panel also serve as finger-holes to facilitate carrying the carton while the perforated separable areas facilitate removal of the cans from the carton. While the carton may be modified in various ways, the particular arrangement shown permits partially dismantling the package in pace with the use of the trapping devices. Thus, removal of top panel area 32a permits easy removal of the two underlying cans and provides a collar for one; the corresponding bottom panel area provides the collar for the other while the remainder of the carton and its contents remain undisturbed.

The devices are readied for use in the manner already described and set out where needed. The rodent, attracted by the bait, enters the can through the non-return entrance member, the fingers of which flex inwardly to enable ingress but prevent egress. Nibbling the bait, the rodent is quickly dispatched with a minimum of suffering and is disposed of trap and all.

While the particular embodiment of the invention disclosed is considered to be the optimum, variations are possible. For example, the non-return entrance member can be constructed with a channel-shaped rim adapted to snap over the bead of the can. This type of entrance member could be attached to a used frozen juice or similar can, baited with any suitable foodstuff at the time of use.

While there have been described what at present is believed to be the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by Letters Patent of the United States is:

1. A lethal trapping device for rodents, comprising:
    a hollow hermetically sealed cylinder providing a closed container having a removable closure at one end;
    a quantity of bait secured in said container adjacent its other end;
    a non-return entrance member within said container adjacent said one end; and
    a cardboard carton for containing a plurality of said containers, said carton being perforated to define separable portions, each portion having an aperture adapting it to slide coaxially over one of the cylinders, collar-fashion, the external bounding configuration of said portions being non-circular to prevent rolling of the cylinder.

2. A lethal trapping device for rodents, comprising;
    a standard size can providing a hollow sheet-metal cylinder; end closures hermetically sealing said cylinder, the closure at at least one end being easily removable;
    a quantity of poisoned bait fixed to the inner surface of said cylinder adjacent the other end thereof;
    a monolithic, flexible-plastic, non return entrance member secured within said cylinder adjacent said one end, said entrance member consisting of a circular rim portion adapted to fit coaxially in the cylinder and a plurality of finger portions extending radially inwardly and toward the other end of said cylinder from angularly-spaced locations on said rim portions, said finger portions terminating close to the central axis of said cylinder and being susceptible to inward deflection while resisting outward deflection; and
    a cardboard carton for containing a plurality of said cylinders, said carton being perforated to define separable portions at least equal in number to the contained cylinders, each such portion having an aperture adapting it to slide coaxially over one of the cylinders, collar-fashion, the external bounding configuration of said portions being non-circular to prevent rolling of the cylinder.

References Cited by the Examiner

UNITED STATES PATENTS

| | | | |
|---|---|---|---|
| 586,025 | 7/1897 | Gardiner | 43—66 X |
| 590,032 | 9/1897 | Anderson | 43—65 |
| 741,935 | 10/1903 | Schickerling | 43—66 |
| 1,352,067 | 9/1920 | Keyser | 43—131 |
| 2,055,912 | 9/1936 | Schonger | 43—65 X |
| 2,490,180 | 12/1949 | Varnedoe | 43—65 |
| 2,553,157 | 5/1951 | Worfford | 43—66 |
| 3,038,600 | 6/1962 | Powell | 206—65 |

OTHER REFERENCES

Popular Mechanics publication, volume 101, No. 3, March 1954, page 148.

SAMUEL KOREN, *Primary Examiner.*

WARNER H. CAMP, *Assistant Examiner.*